Sept. 4, 1951 A. W. MILLS 2,566,951

RECORD CARD FEEDING MECHANISM

Filed Oct. 4, 1945 9 Sheets-Sheet 1

INVENTOR
ALBERT W. MILLS.
BY W. M. Wilson
ATTORNEY

Sept. 4, 1951 A. W. MILLS 2,566,951

RECORD CARD FEEDING MECHANISM

Filed Oct. 4, 1945 9 Sheets-Sheet 2

INVENTOR
ALBERT W. MILLS
BY
[signature]
ATTORNEY

Sept. 4, 1951 A. W. MILLS 2,566,951

RECORD CARD FEEDING MECHANISM

Filed Oct. 4, 1945 9 Sheets-Sheet 3

INVENTOR
ALBERT W. MILLS
BY
[signature]
ATTORNEY

INVENTOR
ALBERT W. MILLS
BY
W. M. Wilson
ATTORNEY

INVENTOR
ALBERT W. MILLS
BY
W. M. Wilson
ATTORNEY

Sept. 4, 1951 A. W. MILLS 2,566,951

RECORD CARD FEEDING MECHANISM

Filed Oct. 4, 1945 9 Sheets-Sheet 6

INVENTOR
ALBERT W. MILLS
BY
W. M. Wilson
ATTORNEY

Sept. 4, 1951 A. W. MILLS 2,566,951

RECORD CARD FEEDING MECHANISM

Filed Oct. 4, 1945 9 Sheets-Sheet 7

INVENTOR
ALBERT W. MILLS
BY W. M. Wilson
ATTORNEY

Sept. 4, 1951 A. W. MILLS 2,566,951

RECORD CARD FEEDING MECHANISM

Filed Oct. 4, 1945 9 Sheets-Sheet 8

INVENTOR
ALBERT W. MILLS.
BY
W. M. Wilson
ATTORNEY

INVENTOR
ALBERT W. MILLS
BY
W. M. Wilson
ATTORNEY

Patented Sept. 4, 1951

2,566,951

UNITED STATES PATENT OFFICE 2,566,951

RECORD CARD FEEDING MECHANISM

Albert W. Mills, Endicott, N. Y., assignor to International Business Machines Corporation, New York, N. Y., a corporation of New York Application October 4, 1945, Serial No. 620,267

4 Claims. (Cl. 271—10)

This invention relates to feeding mechanism and more particularly to feeding mechanism for handling perforated record cards.

Record card feeding mechanisms are generally provided with devices for feeding cards from a hopper, one by one, to a card sensing station where sensing devices sense or read the data perforated in the cards. The card is held in the sensing position for a short period or part of a cycle of operation and then its movement is resumed to advance it to a further sensing station or to a discharge stacker or hopper.

The principal object of this invention is to provide improved mechanism for feeding a record card from a supply hopper to a sensing station.

A more specific object is to provide an improved shuttle mechanism for positively advancing a card to the sensing station and including devices for accurately aligning the card in a direction transverse to its direction of travel.

A still more specific object is to provide devices for coordinating the card feeding and sensing operations, whereby the sensing devices will serve to maintain the card in sensing position independently of the feeding or advancing devices.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is an outside elevation of the apparatus.

Figs. 2 and 2a taken together form a sectional elevation taken on lines 2,2a—2,2a of Fig. 1.

Fig. 3 is a plan elevation with the sensing devices removed to show the card feeding shuttles.

Figs. 4 and 4a taken together form a sectional elevation of the apparatus showing the direction of movement of the cards therethrough.

Figure 1:
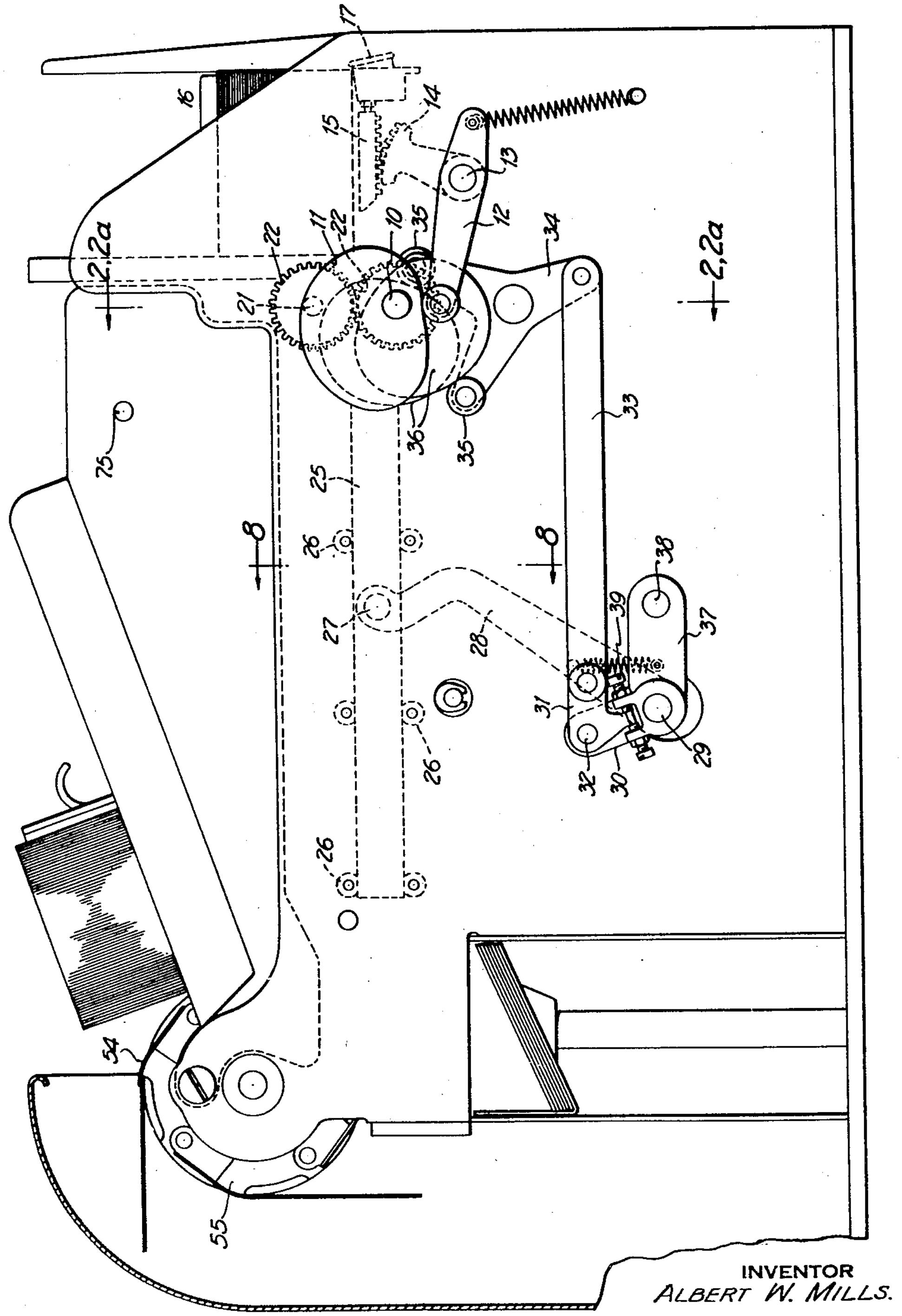
Figure 2:
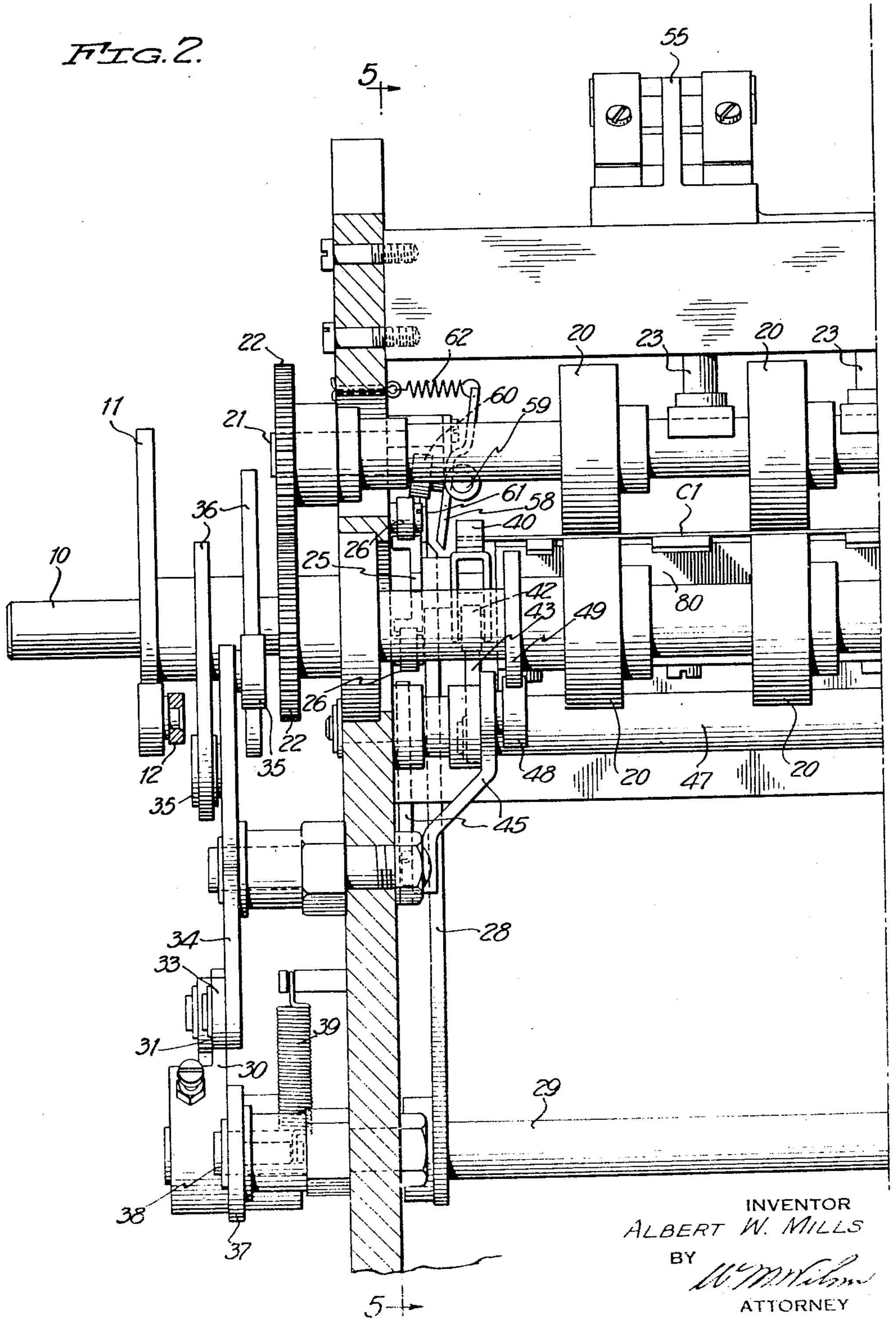

In the drawings (Figs. 1 and 2), 10 represents the main drive shaft of the apparatus, which shaft may be driven from any suitable source of power. Affixed to the shaft is a cam 11 which oscillates a spring urged follower 12 and a shaft 13 to which there are secured arcuate racks 14

(Fig. 4a), each meshing with a reciprocable slide 15 beneath a hopper 16 containing record cards to be analyzed. Attached to slide 15 is a picker knife 17 which, as the slide moves to the left, engages and advances the lowermost card through a throat formed by roller 18 and a guide 19.

The advanced card is gripped by pairs of rollers 20 on shaft 10 and shaft 21 driven from shaft 10, through gears 22. Shaft 21 is pressed toward shaft 10 by the usual spring and bearing 23. The rollers 20 advance the card to a position designated C1 in Fig. 5 and from here it will be advanced to a position C2, then to a position C3, and then to the discharge devices.

The mechanism for advancing the card from its C1 position includes a pair of shuttles 25 of U-shaped cross-section. These shuttles are slidable on rollers 26 (Fig. 8) and each has a pin 27 (Fig. 5) connected to an arm 28 secured on a rod 29.

To the extremity of rod 29 is secured an arm 30 (Fig. 1) which has a bell crank 31 adjustably pivoted thereto at 32. A link 33 extends to a bifurcated follower lever 34 whose rollers 35 engage a pair of complementary cams 36 secured to main drive shaft 10. Thus, as shaft 10 revolves, shuttles 25 are reciprocated, with pins 27 therein moving in a straight line. To enable such movement, rod 29 is supported in a pair of arms 37 pivoted at 38 and biased upwardly by springs 39.

Figure 9:
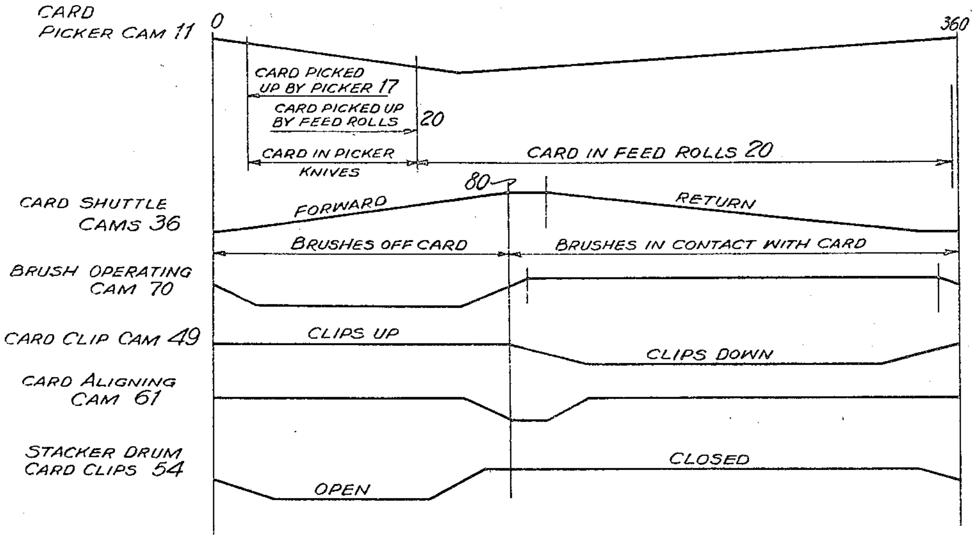
Fig. 9 is a timing chart of a cycle of operation showing the relative time of operation of the various component parts of the apparatus.

In Fig. 9 the relative timing of the operation of the picker and shuttle is represented and indicates that the card shuttle moves forward or away from the card hopper as the picker advances a card and then moves back or toward the picker as the rollers rapidly feed the card ahead, so that at the end of a cycle the shuttles are in their extreme right hand position and the card is in its C1 position.

Figure 7:
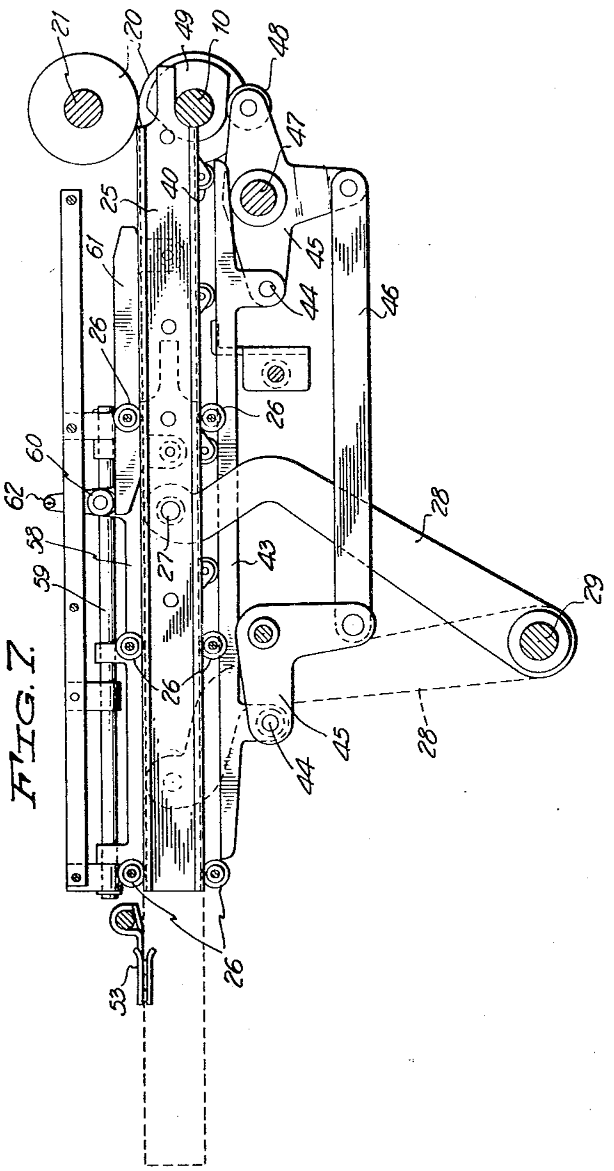

The right end of each shuttle (Fig. 5) has a finger 40 pivoted thereto, spring biased in a counterclockwise direction and a second finger 41 spring-biased in a clockwise direction. Rollers 42 on these fingers ride on tracks 43 supported on bell cranks 45 connected together by a link 46 for parallel movement. A shaft 47 has the two right hand bell cranks secured thereto and in Fig. 7 one of the bell cranks has a third arm provided with a roller 48 engaging a cam 49 on shaft 10.

Figure 5:
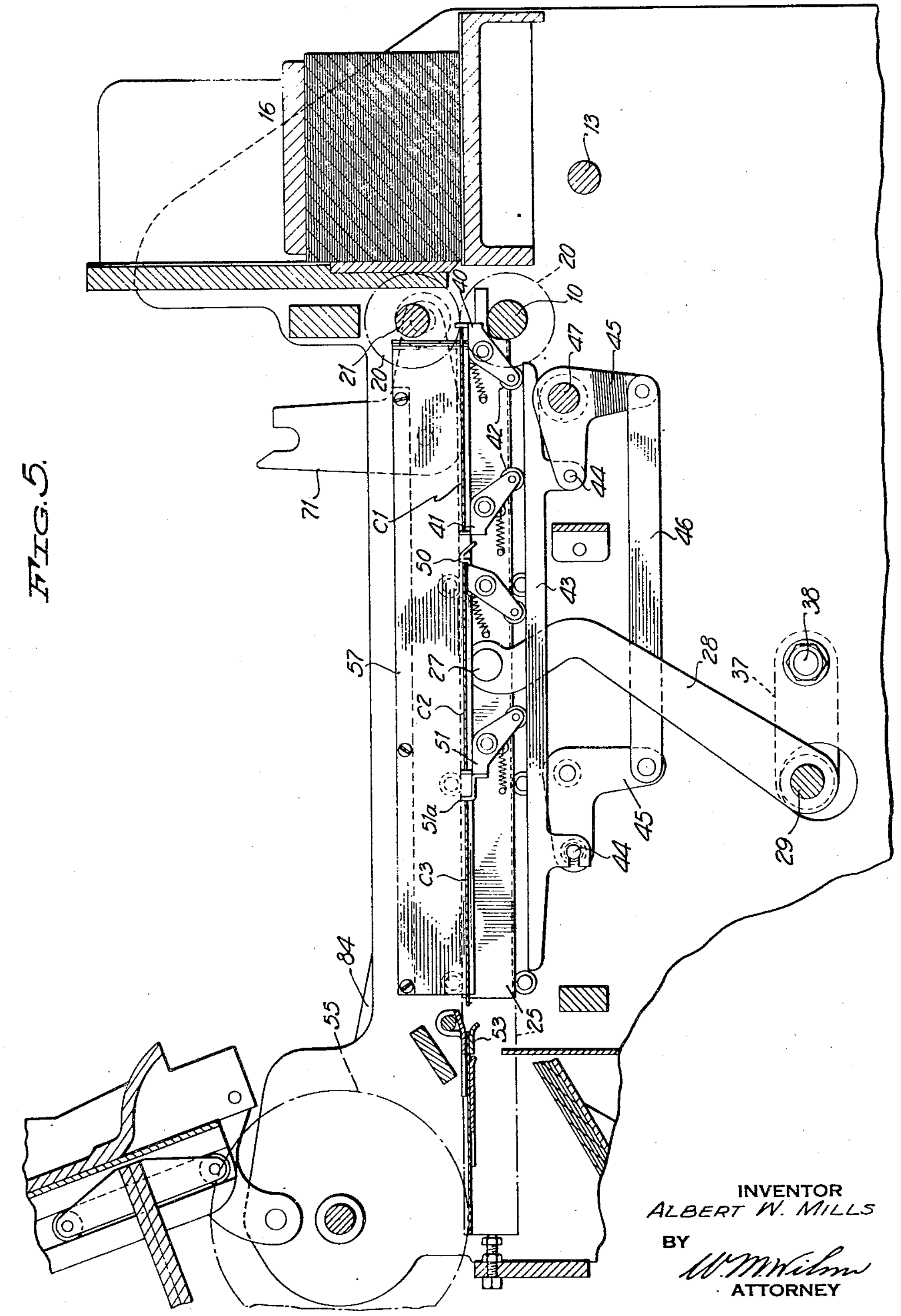
Fig. 5 is a further sectional elevation with the sensing brushes raised out of sensing position.
Figure 6:
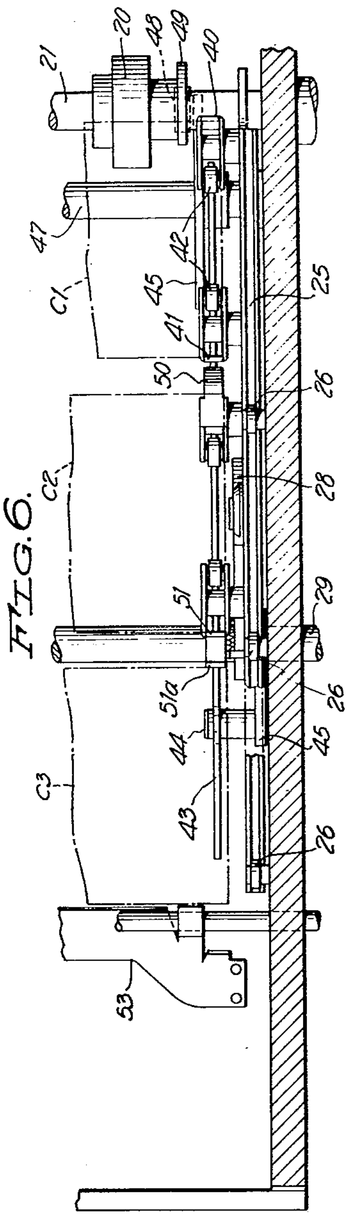
Figs. 6 and 7 are further detail views of the shuttle mechanism and the card clip operating devices.

When roller 48 rides on the low portion of cam 49, track 43 is in its lowered position and fingers or clips 40, 41 are in the position shown in Fig. 5, where they engage the left and right edges of the card in its C1 position.

Thus, during the next cycle as shuttle 25 moves to the left, clips 40, 41 move the card therewith to the C2 position. This period is denoted in Fig. 9 by the portion designated "clips up." Thereafter, cam 49 causes elevation of track 43 which in turn rocks the clips 40, 41 to depress their outer ends beneath the lower surface of the card. They remain in such position while the shuttle returns to the right and while a second card is advanced to the C1 position. When the shuttle reaches its extreme position, the cam 49 again releases the clips and they accordingly engage the leading and trailing edges of the second card and advance it to the C2 position during the next stroke of the shuttles.

A similar pair of clips or fingers 50, 51 is also pivoted on each shuttle 25 and operated in the same manner as clips 40, 41 to advance the card from the C2 to the C3 position. Finger 51 has an extension 51a which serves to engage the right edge of the card to advance it from its C3 position, through a guide 53 and into clips 54 of a stacker drum 55.

By means of the mechanism thus far explained, each card in turn advanced from hopper 16 to positions C1, C2 and C3 in succession and then to the stacker and, as seen from Fig. 9, the cards remain in the C1, C2 and C3 positions for the greater part of a cycle.

Figure 8:
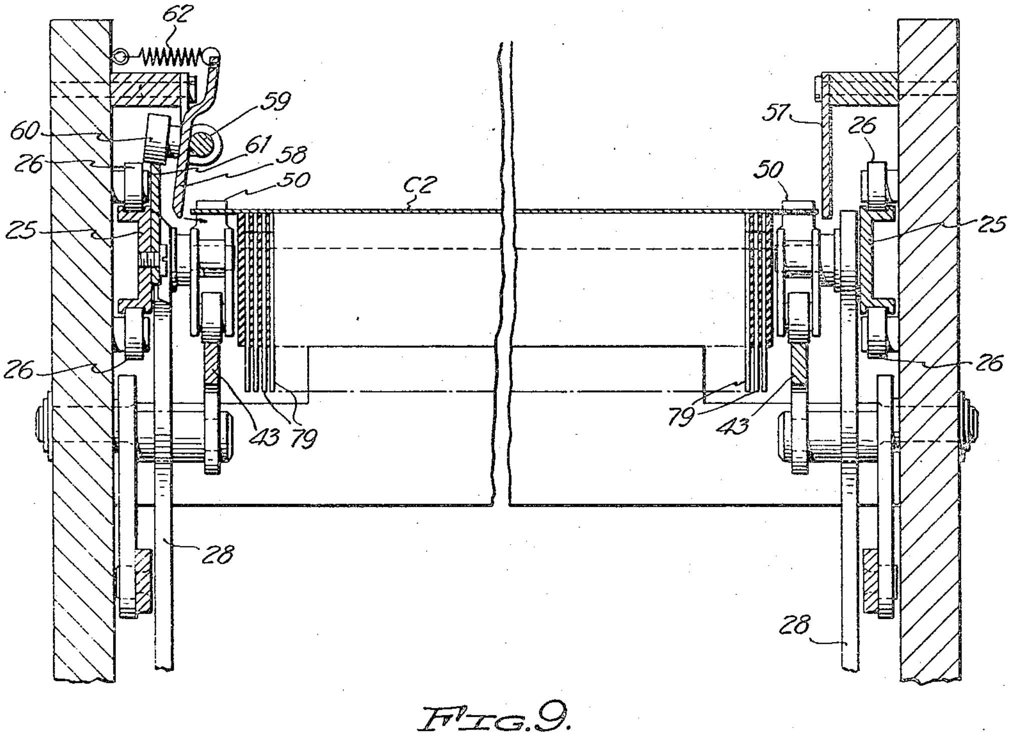
Fig. 8 is a section taken on lines 8—8 of Fig. 1.

Referring to Fig. 8, when the card is in its C1 position (and also when in its C2 and C3 positions), its lies between a stationary plate 57 and a plate 58 pivoted on a rod 59. A roller 60 pivoted on plate 58 rides on a cam 61 secured to one of the shuttles 25 and a spring 62 serves to bias the plate counterclockwise. As seen from Fig. 7, cam 61 holds roller 60 up and consequently holds plate 58 away from the card when the shuttle is to the right and permits the roller to move down during the last part of the shuttle stroke.

The relative timing is indicated in Fig. 9 where it is to be noted that the card aligning cam 61 operates to move the card sidewise against stationary plate 57 while it is still held by the feeding clips and while the card is in forward motion. This positions the cards in accurate alignment with respect to sets of sensing brushes, which sense perforations in the cards during the period that the shuttles return.

Figure 4:
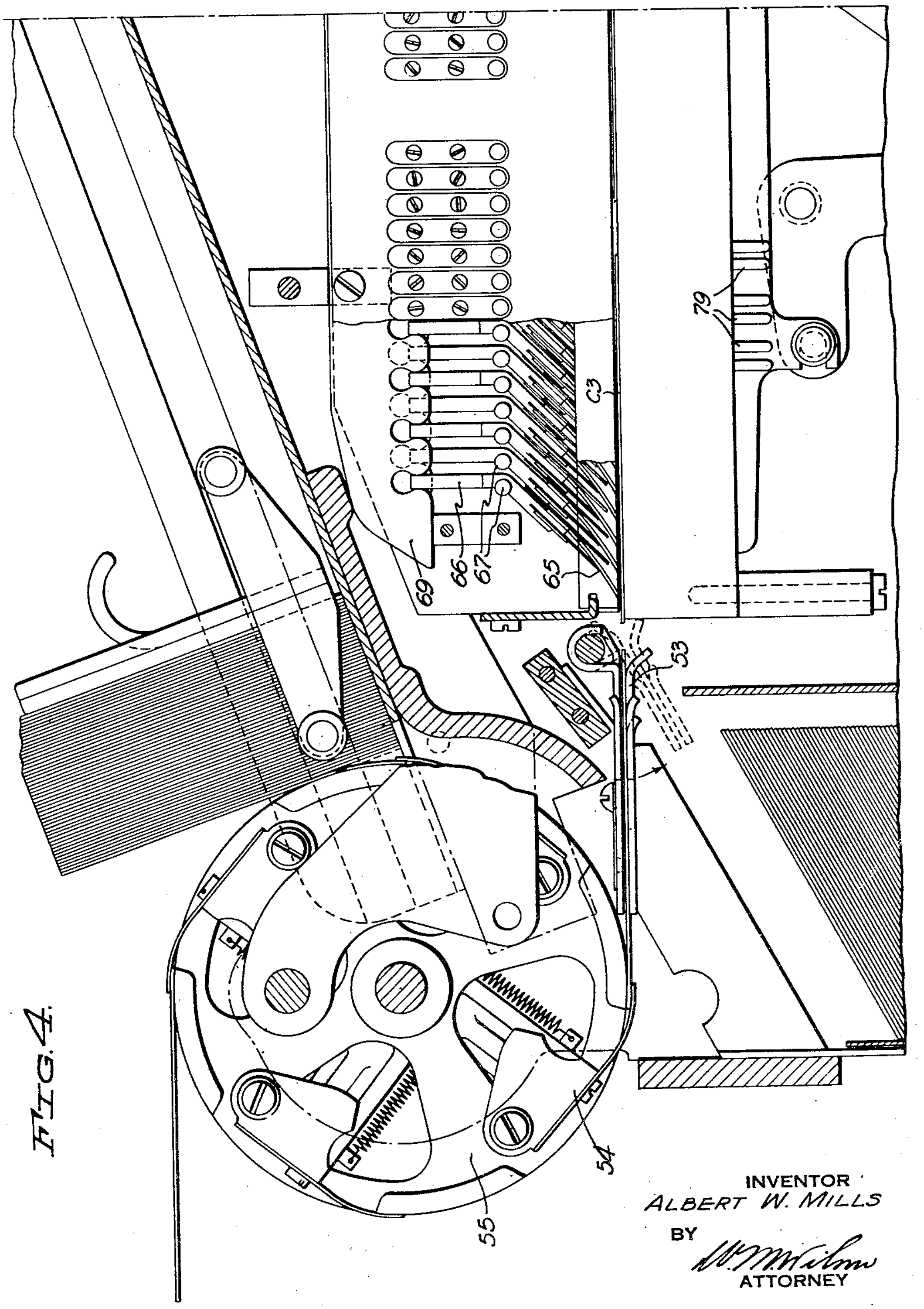

Located above the card positions C2 and C3 (Figs. 4 and 4a) are card sensing brushes 65 arranged in columns and rows to correspond to the usual columns and rows of perforation receiving positions on the cards. Each row of brushes 65 is mounted on an angular bar 66 pivoted at 67 to the frame 68. The upper ends of bars 66 are engaged by a pair of slotted bars 69, each bar 69 engaging alternate bars 66. These bars 69 are horizontally slidable to rock bars 66 about pivots 67 and thus raise the ends of brushes 65 off the cards. The means for effecting such movement includes a cam 70 (Fig. 2a) on shaft 10, which rocks a spring-urged bell crank follower 71 having a slot 72 thereon. A pin 73 riding in the slot is secured in an arm 74 secured to shaft 75. Arm 76 also secured to this shaft has connection at 77 with bars 66 to reciprocate the same.

Figure 4A:
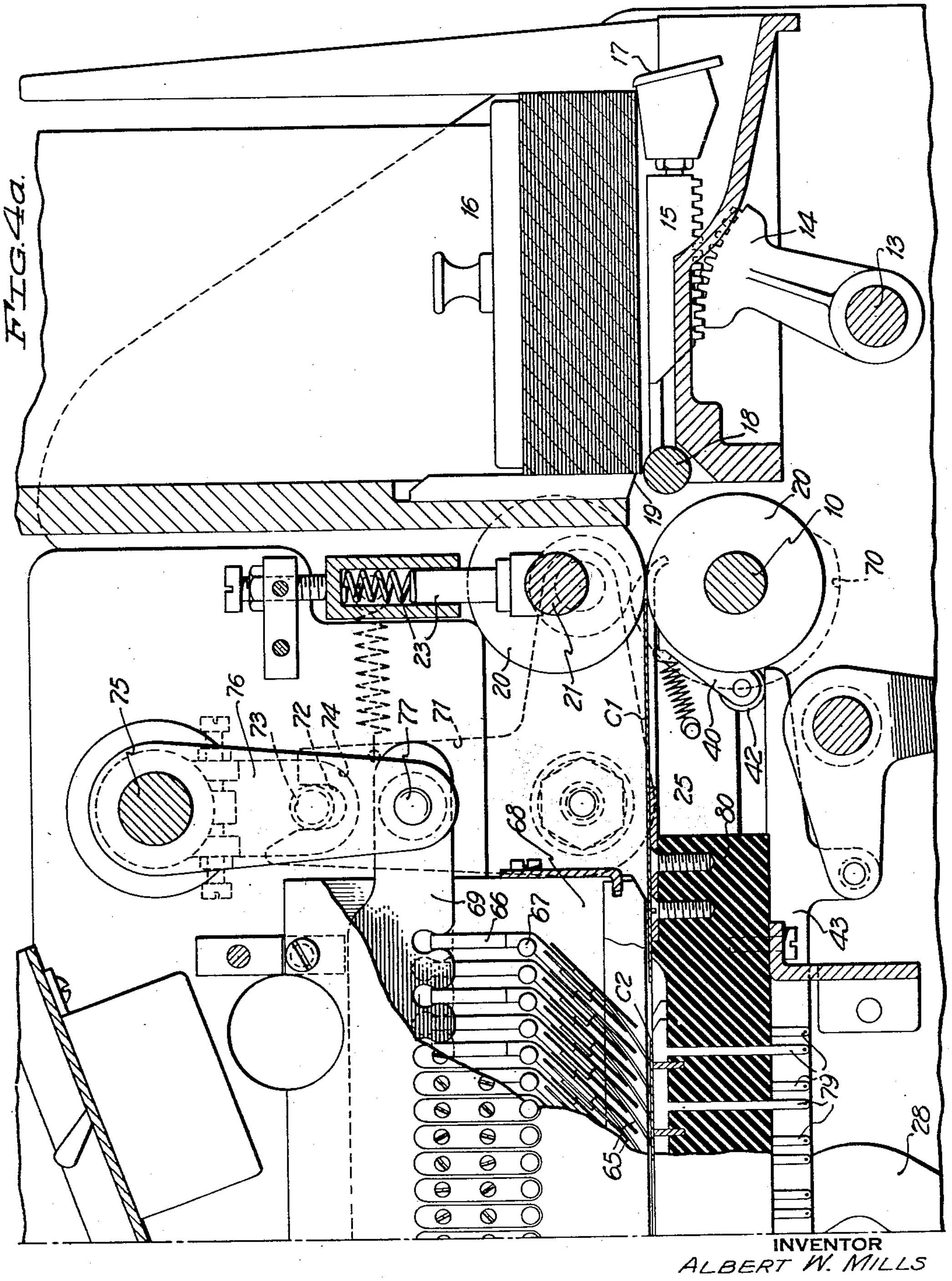

Beneath the cards at the C2 and C3 positions are contact elements 79 embedded in an insulating block 80 and, when the brushes 65 are in their down position as shown in Fig. 4a, a brush 65 in any position coinciding with a perforation in the card will make an electrical connection through such perforation with an insert 79. The particular circuits are not shown and they may be employed to control various well known statistical instrumentalities.

Fig. 9 shows the relative timing of the brush operation and it is to be noted that during the period in the cycle when the shuttle is moving forward with a card held in the clips, brushes 65 are raised off the card and do not touch the card until the shuttles have come to rest.

While the shuttles return with the clips passing beneath the positioned cards, the brushes remain in contact with the cards, and it is during this period in the cycle that circuits may be completed through the card perforations.

It is to be particularly noted as indicated along line 80 (Fig. 9) that the card clips start to move away from the card just as the brushes contact it and thereby hold the card in sensing position and that they so hold it until the next set of clips grip it to advance the card further. Thus, the brushes serve to hold as well as sense the card.

Figure 2A:
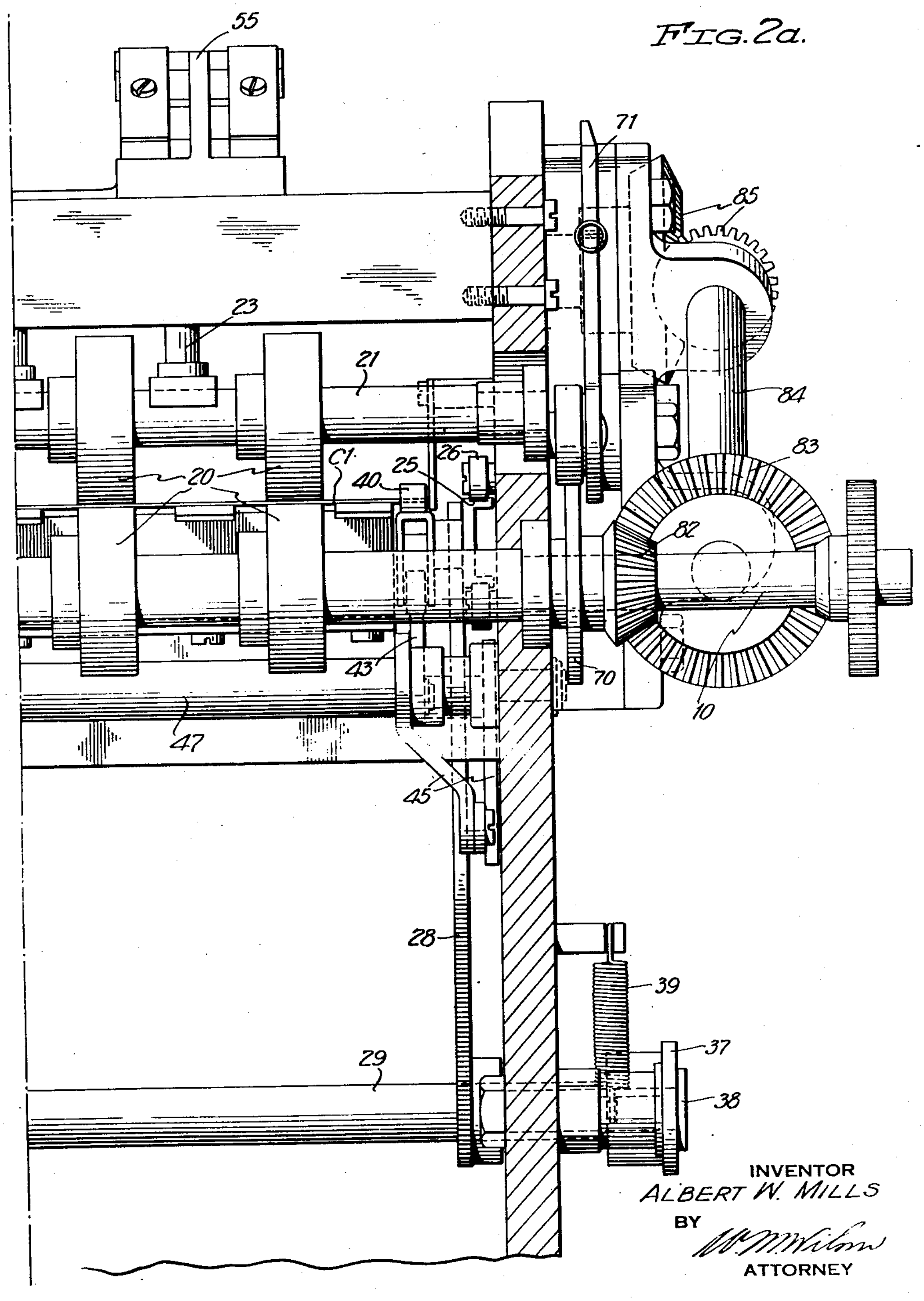
Figure 3:
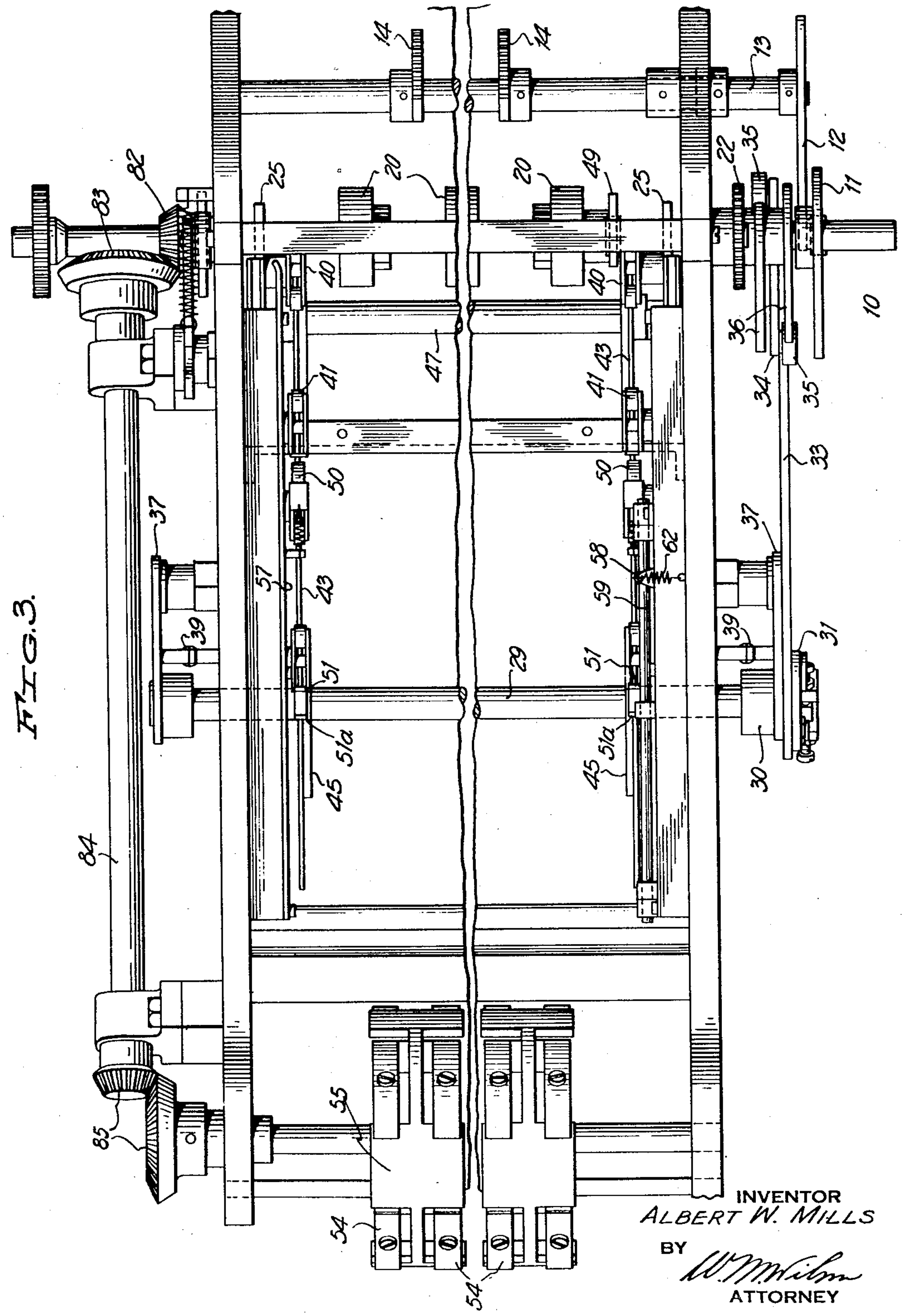

The drive for the stacker drum 55 is shown in Fig. 2a where a bevel gear 82 on shaft 10 drives bevel gear 83 on a shaft 84 and a pair of bevel gears 85 complete the drive connection.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a card handling apparatus having a picker for advancing a card from a supply hopper and rollers to receive the card and propel it along a plane, in combination with a shuttle for receiving the card from said rollers, clips on the shuttle resiliently engageable with the forward and trailing edges of the card to grip and secure the card to the shuttle, means for advancing the shuttle in the direction of feed of the card, means comprising sensing brushes for engaging the card at the termination of its advance by the shuttle to hold it in advance position, and means effective concurrently with said holding for disengaging the clips from the card and returning the shuttle to its initial card receiving position.

2. The invention set forth in claim 1 in which the clips comprise fingers pivoted on the shuttle on one side of the card and projected into the plane thereof, and the means for disengaging the clips comprises cam mechanism for rocking the clips about their pivots to rock the fingers out of the plane of the card.

3. The invention set forth in claim 1 in which aligning mechanism is provided to effect a shift of the card in a direction transverse to its direction of feeding, and means for operating said aligning mechanism while the card is advancing to its sensing position.

4. The invention set forth in claim 1 in which a stationary aligning member is located to one side of the plane of travel of the card and extending in the direction thereof, and means operative as the card is advanced by the shuttle for bearing against the card to slide it in the shuttle in a direction transverse to the direction of its advance, until it engages said stationary aligning member.

ALBERT W. MILLS.

REFERENCES CITED

The following references are of record in the file of this patent:

UNITED STATES PATENTS

| Number | Name | Date |
|---|---|---|
| 552,421 | Comly | Dec. 31, 1895 |
| 1,150,210 | Langston | Aug. 17, 1915 |
| 1,418,117 | Widell | May 30, 1922 |
| 1,725,400 | Last | Aug. 20, 1929 |
| 1,728,329 | Broadmeyer | Sept. 17, 1929 |
| 1,731,834 | Wheeler | Oct. 15, 1929 |
| 1,754,955 | Kruse | Apr. 15, 1930 |
| 1,962,787 | Reifsnyder | June 12, 1934 |
| 2,052,829 | Johnston | Sept. 1, 1936 |
| 2,256,823 | Battey et al. | Sept. 23, 1941 |